April 12, 1966 H. S. EVANS 3,245,188
SCAFFOLDING

Filed March 12, 1962 9 Sheets-Sheet 1

INVENTOR
Hugh S. Evans
BY Kemon, Palmer,
Stewart & Estabrook
ATTORNEYS

April 12, 1966  H. S. EVANS  3,245,188
SCAFFOLDING

Filed March 12, 1962  9 Sheets-Sheet 6

INVENTOR
Hugh S. Evans
BY Kenon Palmer,
Stewart & Estabrook
ATTORNEYS

April 12, 1966  H. S. EVANS  3,245,188
SCAFFOLDING

Filed March 12, 1962  9 Sheets-Sheet 8

INVENTOR
Hugh S. Evans
BY Kenyon, Palmer,
Stewart & Estabrook
ATTORNEYS

United States Patent Office 3,245,188
Patented Apr. 12, 1966

3,245,188
SCAFFOLDING
Hugh Stanford Evans, 9A Westway Raynes Park,
London, England
Filed Mar. 12, 1962, Ser. No. 178,977
Claims priority, application Great Britain, Mar. 17, 1961,
9,829/61
19 Claims. (Cl. 52—638)

The present invention is concerned with improvements in or relating to scaffolding, and prefabricated load-bearing structures.

Scaffolding has many uses. Three common examples of the uses to which it can be put are supporting working platforms for maintenance work on buildings, supporting shuttering for the erection of concrete structures and providing supports for structures such as grandstands.

Prefabricated frames for scaffold structures have already been devised, but the known frames have the disadvantage that they can be combined in only a limited number of ways and cannot easily be interconnected to provide a scaffold structure having a base plan constituted by any but the simplest geometrical forms.

The present invention provides prefabricated members which can be easily fitted together to provide a large number of different scaffold structures having a large variety of base plans of very different sizes, and which are perfectly braced, i.e. are braced at all the joints. Because of this satisfactory bracing, the scaffold structures made from the present prefabricated members are statically determinate, i.e. the loads in the structure can be accurately calculated, and thus full use can be made of the load-bearing capacity of the structures.

In its broadest aspect, the invention provides a scaffold member for the construction of scaffolding comprising a single upright having a connecting pin projecting axially from an end thereof, an axial socket formed in the other end of the upright to receive the connecting pin of a like scaffold member, and an arm extending from the upright and having on the free end thereof a coupling member for coupling with corresponding coupling means on the upright of a like scaffold member.

The invention also provides a scaffold member for the construction of scaffolding comprising a single upright having a connecting pin projecting axially from an end thereof, an axial socket formed in the other end of the upright to receive the connecting pin of a like scaffold member, an arm extending from the upright on one side thereof and having on the free end thereof a coupling member for engagement with corresponding engagement means on the upright of a like scaffold member, and a second arm extending from the upright on the opposite side thereof, said second arm also having on its free end a coupling member for coupling with corresponding coupling means on the upright of a like scaffold member.

A convenient form of scaffold member according to the invention has arms extending symmetrically on both sides thereof and will be normally used in conjunction with scaffold members having only one arm.

The coupling means provided on the uprights of the scaffold members are located in such positions that if the members are disposed with their ends in the same planes, the coupling members on the ends of the arms of the scaffold members will engage with the coupling means on the uprights of adjacent scaffold members.

The arms of the scaffold member may conveniently be arranged to extend at right-angles from the stems at one end thereof, thus providing a T-shaped member for the construction of scaffolding and provided with a connecting pin which projects axially from the free end of the upright of the T-shaped member, the other end of the upright being formed with an axial socket to receive the connecting member of a like T-shaped member, a coupling member being provided at each end of the cross-member of the T for engagement with coupling means on a like T-shaped member and provided on the stem of the said like T-shaped member near the junction of the upright with the cross-member of the T and further coupling means like the said coupling means also being provided on the upright of each T-shaped member near the connecting pin.

The invention also provides an L-shaped member for the construction of scaffolding, one arm of the member, called the upright, being provided with an axially projecting connecting pin at its free end and being formed at its other end with an axial socket for receiving the connecting pin of a like L-shaped member, the free end of the other arm of the L-shaped member being provided with a coupling member for coupling with coupling means on a like L-shaped member and provided on the upright of the said like member near its junction with the other arm of the said like member and further coupling means like the said coupling means also being provided on the upright of each L-shaped member near the connecting pin.

L-shaped members and T-shaped members will normally be used together and in this case they will be made so that the connecting pins, sockets, and coupling members and means are of corresponding sizes so that they will co-operate with one another.

Thus, the invention also comprises a plurality of L-shaped members and a plurality of T-shaped members having connecting pins, sockets and coupling means of corresponding sizes with the result that the members can be fitted together by means of their connecting pins, sockets and coupling means to form scaffolding.

The invention also comprises scaffolding constructed wholly or partly from the T-shaped members and L-shaped members described above.

L-shaped members and T-shaped members according to the invention, and other members which may be used with the L-shaped members and T-shaped members will now be described, by way of example, with reference to the accompanying drawings. The members have been partly broken away in the drawings in order to illustrate them more conveniently.

Members other than those shown may also used together with the L-shaped members and T-shaped members in order to construct scaffolding units and such additional members will be described below.

Figure 3:
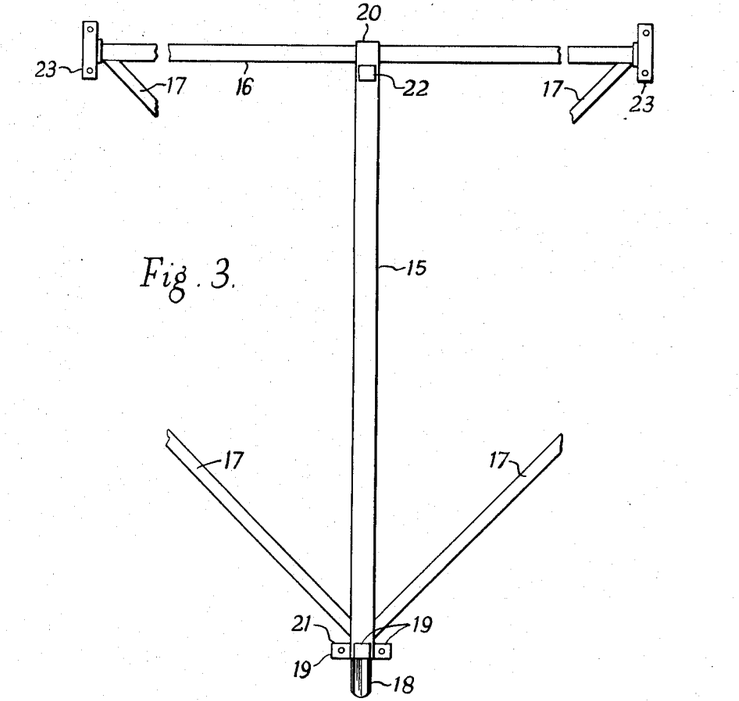
FIG. 3 is a diagrammatic side view of a T-shaped member.

Referring to the drawings, the T-shaped member shown in FIG. 3 has an upright in the form of a stem 15 constituted by a square-section tube 4 ft. long. The cross-member 16 of the T is constituted by two arms, each slightly less than 4 ft. in length, which are welded to opposite sides of the stem 15 at one end thereof. The arms are almost flush with the end of the tubular stem and leave the end open.

In order to secure the arms of the cross-member 16 more rigidly to the stem 15, a bracing member 17 is welded between the free end of each arm and the free end of the stem.

To enable the member to be connected to a like T-shaped member or to a similar L-shaped member below it by means of the socket 20 constituted by the open end of the tubular stem 15 of the lower member, a connecting member 18 in the form of a connecting pin is secured to the stem 15 at its free end. The connecting member is made from two rectangular metal plates each formed with a longitudinal central slot extending halfway along its length. In making the connecting member, the plates are slotted into each other so that their ends are disposed in the same planes, they are then arranged at right-angles to one another and are welded to one another.

The connecting member is made of such a size that it will engage tightly in the tubular stem 15 with the two plates extending diagonally of the square-section tube. The connecting member is arranged to extend some way into the stem so that it is rigidly mounted in the stem and projects axially from it. It is tack-welded to the stem. The projecting part of the connecting member 18 can be fitted into the open end of the stem 15 of a like T-shaped member or a similar L-shaped member thus connecting the two members together.

To provide means for enabling the T-shaped member to be coupled with other like T-shaped members and to similar L-shaped members, there are welded round the free end of the stem, i.e. the end to which the connecting member 18 is secured, four U-shaped metal channel members 19. Each channel member 19 is approximately 1¼ in. long and one member is secured on each of the four sides of the stem 15. The open side of each channel 19 is directed towards the stem 15 and the channels are disposed longitudinally of the stem so that each channel member forms, together with the stem, a socket 21 the mouth opening of which extends across the stem. In this embodiment the mouth openings of the sockets 21 are 1 5/16 in. in length across the stem and 13/16 in. wide.

Near the other end of the stem, immediately below the arms of the cross-member 16, two further channel members 22 are welded to the stem 15. One of these channel members is welded to the front of the stem and one to the back, the front and back of the stem being those sides of it which do not have an arm of the cross-member welded to them. These two further channel members 22 also form sockets 21 with the stem similar to the sockets described above.

Coupling means constituted by lugs 23 are provided on the member as follows for coupling with corresponding coupling means constituted by the channel members 19 and 22 on other members, the lugs engaging in the sockets 21 formed by the channel members. On the free end of each arm of the cross-member 16 is welded a metal lug 23 which in this embodiment is 1¼ in. by ¾ in. by 4½ in. long. The lug is secured across the end of the arm at right-angles to the arm with its longitudinal sides parallel to the stem of the T-shaped member and it projects to the same extent on the side of the arm remote from the stem and on the side of the arm near the stem, thus forming, when the stem of the member is vertical, an upwardly directed hook and a downwardly directed hook for engagement with the channel members 19 and 22. The lugs 23 are of such a size that they will engage in the sockets described above.

Figures 1, 2:
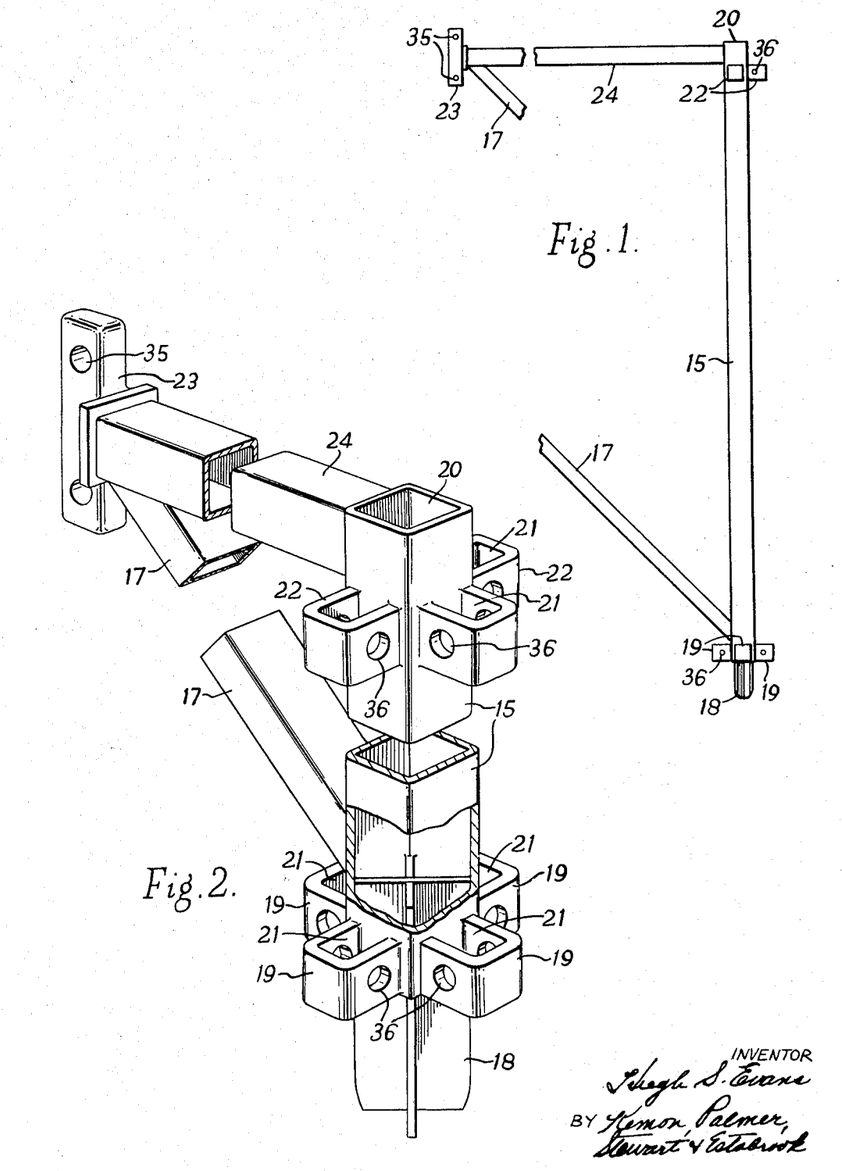
FIG. 1 is a diagrammatic side view of an L-shaped member.
FIG. 2 is a perspective view on a larger scale of the L-shaped member shown in FIG. 1.

The L-shaped member shown in FIGS. 1 and 2 is constructed in a similar way to the T-shaped member and the same reference numerals will be used to indicate like parts of the two members. The L-shaped member has an upright in the form of a stem 15 provided with a connecting member in the form of a connecting pin. It differs from the T-shaped member in that it has only one arm 24 of a cross-member instead of two and in that it has an additional channel member 22 located at the same position along its stem 15 as the other channel members 22 and on the side of the stem opposite to the arm 24.

The construction of the L-shaped member can be clearly seen in the perspective drawing of the member in FIG. 2.

Other members which can be used in conjunction with the T-shaped members and L-shaped members to form scaffold structures will now be described. Most of these members have parts equivalent to the parts of members already described and the same reference numerals will be used to indicate equivalent parts.

The overall dimensions of the L-shaped member just described excluding the projecting part of the connecting member or pin may conveniently be 4 ft. along the stem 15 and 4 ft. along the arm 24. The T-shaped member will then be 4 ft. by 8 ft. However, similar members may sometimes be conveniently used having, for example, an arm 4 ft. long and a stem 2 ft. long in the case of an L-shaped member and a cross-member 8 ft. long and a stem 2 ft. long in the case of a T-shaped member. A convenient notation for referring to such members is to write down the letter F to indicate that a frame is being referred to and then to write down the length in feet along the arm or cross-member of the member and then the length in feet along the stem of the member. In this notation, an L-shaped member 4 ft. by 4 ft. will be indicated as F44. A T-shaped member having a cross-member 8 ft. long and a stem 2 ft. long will be indicated as F82. L-shaped members F24 and F22 are often found especially convenient in small scaffold structures such as those used for supporting working platforms for carrying out domestic decorating.

Figures 4, 6:
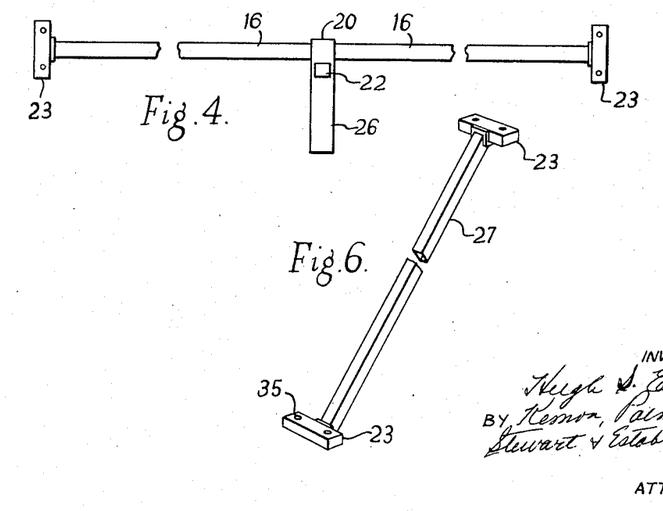
FIG. 4 is a diagrammatic side view of a ground tie which may be used with the present L-shaped and T-shaped members.
FIG. 6 is a perspective view of a diagonal tie.

FIG. 4 shows a ground tie-member which is used to support the scaffold structures formed of L-shaped and T-shaped members. The ground tie-member shown is similar to a T-shaped member. It has a short square-section tubular stem or upright 26 and a cross-member 16 with lugs 23 at its two ends. A socket 20 to receive a connecting member 18 is provided at one end of the stem 26 and channel members 22 are secured on the stem 26 to enable the member to be engaged with other like or similar members.

The ground tie-member shown may be referred to as T8. A ground tie-member T4 corresponding to an L-shaped member is also used frequently and ground tie-members of other sizes, for example T2 may be used.

FIG. 6 shows a diagonal tie for a 4 ft. square. The tie comprises a stem 27 having a lug 23 at each end, the lugs 23 being inclined to the axis of the stem 27 as shown to enable them to be engaged in the sockets 21 of the L-shaped and T-shaped members arranged to form a square as described below.

The diagonal shown is referred to as D1. Diagonal ties to fit squares of other sizes may be used.

Figure 7:
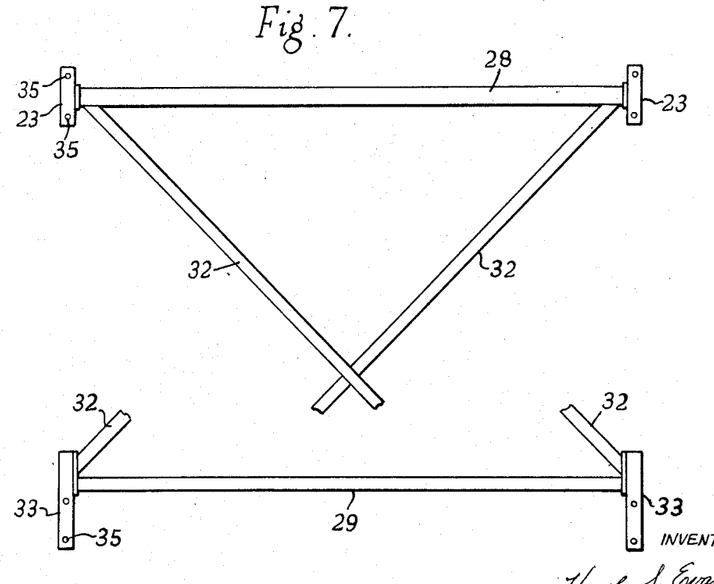
FIG. 7 is a diagrammatic side view of a brace.

FIG. 7 shows a bracing member which will be referred to as BX44. It is 4 ft. long and 4 ft. high and comprises two parallel arms 28 and 29 interconnected by two diagonals 32. To each end of the arm 28 is welded a lug 23 and to each end of the arm 29 is welded a lug 33 which projects below the arm 29 in the figure, the downward projection having the same size and shape as the lugs 23. Each lug 33 also projects above the arm 29 and the upward projection is welded to the corresponding diagonal 32 and thus serves to connect the diagonal to the arm 29.

Frames such as BX44 are used for bracing single posts or long span beams to be described below.

Two single posts which may be used in conjunction with the present L-shaped and T-shaped members will now be described.

The first post comprises a tubular square-section stem 4 ft. long. At one end a connecting member or pin like the connecting members 18 referred to above is secured to the stem and projects axially therefrom. Four channel members are welded one to each side of the stem at the end thereof near the connecting member. These channel members are like the channel members 19 and 22 and form with the stem sockets 21.

Near the end of the post remote from the connecting member, four further channel members corresponding to the channel members 22 are welded one to each side of the post.

The second post to be described has a tubular square-section stem 8 ft. long. At one end a connecting member is secured in the stem and near the other end four channel members corresponding to the channel members 22 are welded to the post.

Near the middle of the post, at a distance from the last-mentioned channel members corresponding to the distance between the channel members 22 and the channel members 19 on the normal F84 or F44 members, four coupling or engagement members are secured. These engagement members each comprise two side pieces welded to a side of the stem of the post and form therewith a socket similar in size and shape to the socket 21 but not having an outer side member corresponding to the bottom wall of the channel members 22 or 19 which interconnects the two side walls of the channel member.

Nearer to the connecting member than the aforesaid engagement means four channel members are welded one to each side of the stem of the post. These channel members are located at a distance from the connecting member corresponding to the distance therefrom of the channel members 22 in the normal F84 or F44 member.

At the end of the post near the connecting member, four channel members corresponding to the channel members 19 are welded to the stem of the post.

Longer posts, for example 12 ft. long, may be used. The longer posts will have channel members or open-sided engagement means welded to them in positions corresponding to the positions just described.

Figure 8:
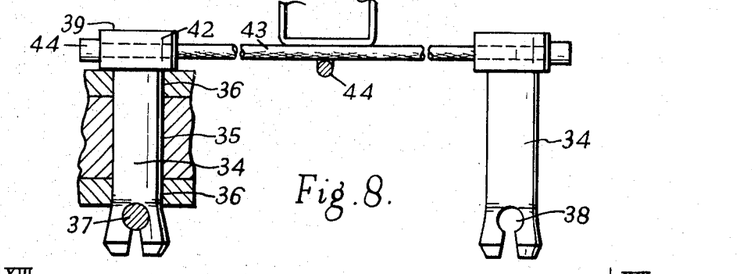
FIG. 8 is a detail showing pins which may be used to secure the scaffolding units together.

FIG. 8 shows a pin 34 which provides one method of securing the members forming a scaffold structure together when they have been assembled. In the assembled structure, lugs 23 are engaged in sockets 21 in the channel members 19 or 22 with the holes 35 formed in the plates in correspondence with the holes 36 formed in the channel members. A pin 34 can then be inserted through both holes to secure the members of the scaffold structure together. The pins 34 can be held in place by nails or split pins 37 inserted in the holes 38 formed in the pins 34.

In one section of FIG. 8 a pin 34 is shown inserted in holes 35 and 36. Another section of FIG. 8 shows how the pins 34 are attached to the frame members. The sections of the figure are not shown in the correct spatial relation to one another.

Each pin 34 is formed with an enlarged head 39 having a hole 42 through it. A wire rope 43 is threaded through the hole 42 and has an enlarged end 44 secured on it which maintains the pin 34 on the rope. In the case shown, two pins 34 are carried on the same wire rope 43. The wire rope 43 is secured to a cross-member or an arm of a T-shaped or L-shaped member near the outer end of the cross-member or arm, i.e. the end which is joined to the bracing member 17 and carries the lug 23. The wire rope 43 is secured to the underside of the cross-member or arm, i.e. the side nearer the bracing member, by means of a metal hoop 44 fixed to the cross-member or arm.

Figure 9:
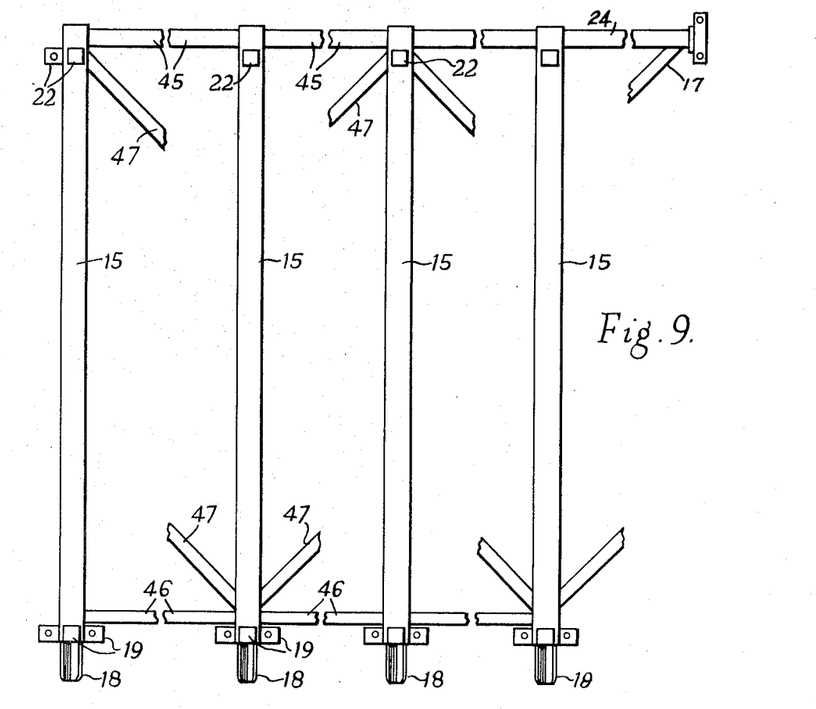
FIG. 9 is a diagrammatic side view of a beam which may be used in the construction of a scaffold unit.

FIG. 9 shows a beam which may be used in the construction of a scaffold unit. The beam is 16 ft. long and 4 ft. high and is therefore indicated by the reference F164. It comprises four stems or uprights 15 joined by arms 45 and 46 and diagonal braces 47. At one end of the beam, an arm 24 corresponding to the arm of an L-shaped member projects from the end stem 15 and a bracing member 17 is secured thereto and to the beam.

At the bottom of each stem 15 is secured a connecting member 18 and round the bottom of each stem are secured four channel members 19. At the top of each stem are secured two channel members 22 except in the case of the left-hand channel member in the figure which carries three channel members 22 as does the stem of an L-shaped member.

Similar made-up beams of different sizes can be constructed. For example beams 24 ft. long (F244), 32 ft. long (F324) or as long as 44 ft. long (F444) may be found useful in some cases.

Beams of this kind are normally used to form a span between two towers or to build a foot bridge, but once made they can be incorporated with the standard T-shaped and L-shaped members into other scaffold structures.

Figure 10:
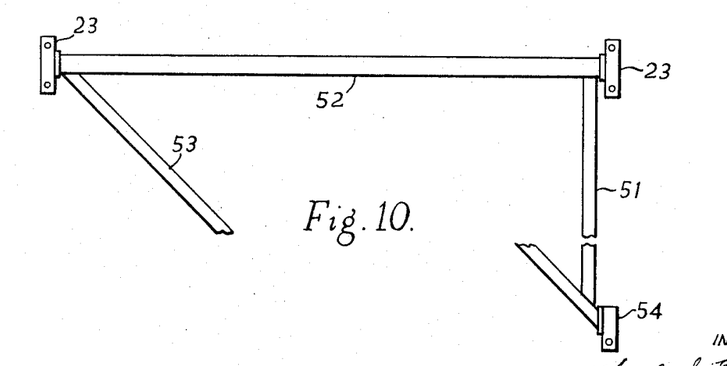
FIG. 10 is a diagrammatic side view of a triangular-shaped brace.

FIG. 10 shows a triangular-shaped brace 4 ft. long and 4 ft. high which is used for bracing beams such as that shown in FIG. 9. The brace comprises a stem 51 welded to an arm 52 and a diagonal 53. To each end of the arm 52 are welded lugs 23 and to an end of the arm 53 which projects beyond the stem 51 is welded a lug 54 which corresponds to one half of a lug 23.

The reference for this brace is B44.

Figures 11, 16:
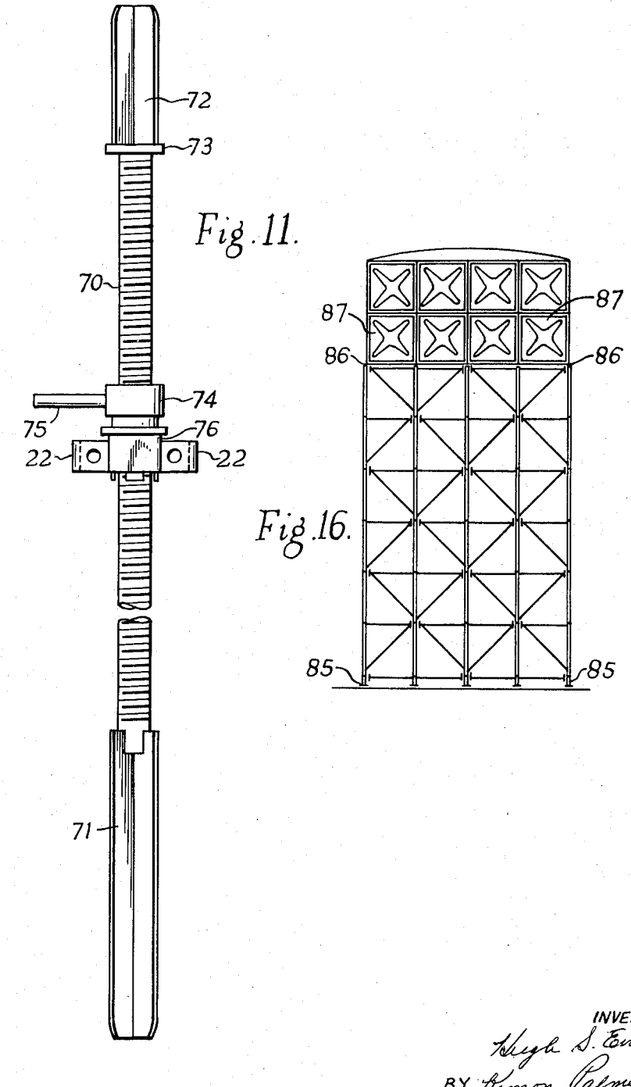
FIG. 11 is a side view of an adjustable post.
FIG. 16 is a diagrammatic elevation of a further structure which can be made with the present members.

FIG. 11 shows an adjustable post 70 (indicated by the reference AP1) which may be used in scaffold structures in conjunction with the present L- and T-shaped members. At one end, intended in use to be the lower end of the post, an elongated connecting member 71 is welded to the post. At the other end, a connecting member 72 is welded to a plate 73 which is welded to the post.

The post is screw-threaded throughout its length and carries a threaded collar 74 to which is secured a handle 75. A square-section bearing collar 76 is also carried on the post 70 and is freely movable thereon. The collar 76 has two channel members 22 welded to it to form sockets 21.

In use, the connecting member 71 is located from above within the stem 15 of an L- or T-member together with a portion of the threaded part of the post, the bearing collar 76 rests on the top of the stem and the threaded collar 75 rests on top of the bearing collar 76 and supports the post. The post can be raised or lowered by turning the collar 74 by means of the handle 75.

This adjustable post is especially useful for example when the scaffolding is being used to support shuttering for concrete which has to be accurately located.

Other constructional members which may be used in building scaffold structures with the present L- and T-members and which are not shown in the drawings are as follows.

A straight brace B4 4 ft. long overall and comprising a square-section length of tube with a lug 23 welded squarely to it at each end may be used with the single posts described above or with beams such as that shown in FIG. 9.

Base plates (BP1) for the scaffolding each comprise a 6 in. square metal plate having welded to its centre an upstanding connecting member like the connecting member 18. The connecting members of the base plates fit into the stems of the ground tie-members and support them as described later.

Adjustable base plates for the scaffolding each comprise a 6 in. square metal plate having welded to its centre an upstanding screw-threaded post approximately 6 in. long. A short connecting member is welded to the free end of the post. A threaded collar having a handle, and similar to the threaded collar 74 on the adjustable post shown in FIG. 11, is carried on the screw-threaded post. A bearing plate is freely carried on the post on the side of the threaded collar remote from the square metal plate, i.e. on the upper part of the post. In use, the short connecting member will be located within the stem of a ground tie-member and the bottom of the stem will rest on the bearing plate which is supported on the bearing collar. To alter the position of the bearing plate and thus the effective base level for a structure supported on the ground tie-member the threaded collar is turned to move it up or down the post.

Cap plates (CP1) for the scaffolding each comprise a 6 in. square metal plate to the centre of which is welded a short length of square-section tubing of the same size as the tubing of the stems 15 of the L- and T-members, and having secured to each of its sides a channel member 22. From the tubing projects a connecting member like the connecting members 18.

A plurality of T-shaped members and L-shaped members like those described can be fitted together to form scaffold structures of numerous shapes and sizes. In order to ensure that the members will be disposed at right-angles to one another in the scaffolding, the members are made in a standard range of sizes and the arms which project from the stems are slightly shorter than the stems.

Normally, in a scaffolding, the stems of the members will be vertical and the arms will extend horizontally. The scaffolding is normally erected on base plates such as those described above, BP1 or ABP1, and the structure is connected together at ground level by ground ties such as T2, T4 and T8, the stems of which fit onto the connecting members projecting upward from the base plates. The connecting members of the first layer of L-shaped and T-shaped members, which will be referred to as the members of the first lift, are accommodated in the upper parts of the stems of the ground ties.

A scaffold tower 8 ft. by 4 ft. will now be described with reference to FIG. 5, to illustrate the way in which the present scaffold members may be fitted together.

The tower is supported on six base plates BP1 which rest on the surface on which the tower is to be erected, and the connecting members of which are engaged in the stems of the ground ties of the tower. The base plates are omitted from FIG. 5 for the sake of clarity.

Along one side of the base of the tower is disposed a ground tie (T8) 56. At one end of the tie 56 is located a ground tie (T4) 57, the stem of the tie 57 being at the corner of the tower and the lug 23 at the end of the cross-member of the tie 56 being engaged in the socket 21 in a channel member 22 on one side of the stem of the tie 57. The channel members 22 are omitted from FIG. 5 for the sake of clarity. A ground tie (T4) 58 is similarly arranged at the other end of the tie 56.

A ground tie (T4) 59 is disposed with its stem at a corner of the tower and is engaged with the tie 57, the lug 23 on the arm of the tie 57 being engaged with a channel member on the stem of the tie 59. The arm of the tie 59 extends along one side of the base of the tower and the plate 23 at the end of the arm is engaged with a tie (T4) 60, the stem of which is located at the centre of this side of the base and the arm of which extends across the base and is engaged with the stem of the tie 56.

A further tie 61 is disposed with its stem at the final corner of the base and engaged with the tie 58; the arm of the tie 61 extends along one side of the base and is engaged with the stem of the tie 60.

The first group of L- and T-members (the first lift) is supported on the base made up of ground ties as described above. Above each stem of a ground tie is located the stem of an L- or T-member, the connecting members projecting from the lower ends of the stems of the L- and T-members extending into and providing a connection with the stems of the ground ties. The upwardly projecting parts of the lugs 23 on the arms of the ground ties are engaged in channel members 19 on the lower ends of the stems of the L- and T-members. Thus, by arranging that the lugs extend upward as well as downward from the arms and cross-members firmer bracing of the members of the scaffold structure is obtained. This feature that the arms and cross-members of a lift are engaged with the stems of the next higher lift is provided between all the lifts of the structure.

A T-member 62 is arranged along the side of the tower above the two ties 59 and 61 which are of the type T4. L-members 63 and 64 extend across each end of the tower; L-members 65 and 66 extend along the side of the tower above the tie 56 and an L-member 67 extends across the centre of the tower.

The T- and L-members of the second lift (not shown) are arranged in the same pattern as the ground ties, a T-member being disposed above the L-members 65 and 66 and two L-members being disposed above the T-member 62.

The third lift and other odd lifts are arranged in the same way as the first lift. The fourth lift and other even lifts are arranged in the same way as the second lift. In this way, the amount of play in the structure is reduced.

Figure 5:
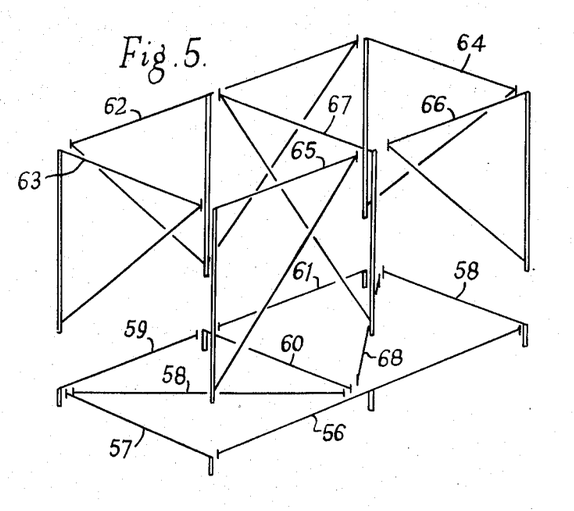
FIG. 5 is an exploded diagrammatic perspective view of a scaffold structure.

Two diagonal braces 68 are shown in FIG. 5, in the approximate position which they occupy in the completed structure. The lugs 23 of the braces 68 are engaged with the vacant channel members on the stems of the L-members 63, 67 and 64 located above the arms of the ground tie-members 59, 56 and 61 respectively. Only the bottom parts of the lugs are engaged in the channel members, the upper parts being free, but both upwardly and downwardly projecting parts of the lugs are provided to enable the braces to be used in other positions.

Diagonal braces may also be provided at other places in the tower structure of FIG. 5 Some braces may be omitted from light access scaffold structures.

Some further structures which can be erected with the present members will now be described with reference to the diagrams of FIGS. 12 to 21. These figures show elevations and sections of various scaffold structures. The stems of the frame members forming the structures are shown in the elevational views with double lines and the arms, cross-members and braces are shown by single lines. The lugs at the ends of the arms and cross-members are shown. In the sectional views, the stems are shown by squares and the arms and cross-members by single lines. The channel members in which the lugs 23 are engaged are omitted from all these diagrams.

In forming the scaffold structures, the following rules should, in general, be followed in order to gain the maximum rigidity:

(1) Use T-members wherever possible.

(2) If an L-member or T-member is to be placed on top of another L-member or T-member then the arms of the upper member should point in directions of right-angles to the arms of the lower. This of course necessitates a different arrangement of the members in an upper lift from the arrangement in the lift below.

(3) The position of T-members in successive lifts should be staggered so that the stems of successive T-members are not in one line.

These measures ensure that the play in one lift is not in the same direction as the play in the storeys immediately above and below.

Referring more particularly to FIGS. 12 to 15, these figures illustrate a structure comprising four towers connected together at their topmost storey.

Figure 12:
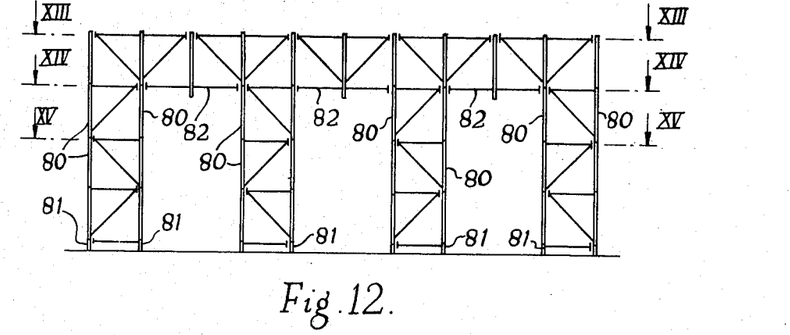
FIG. 12 is a diagrammatic elevation of one form of structure which can be made with the present L-shaped and T-shaped members.
Figure 13:
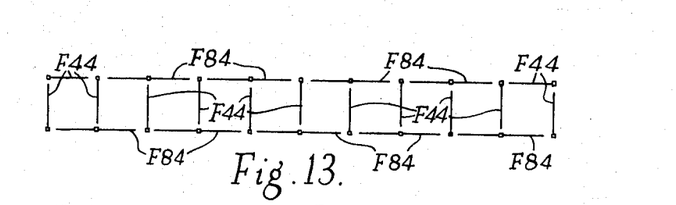
FIGS. 13, 14 and 15 are sections on lines XIII—XIII, XIV—XIV, and XV—XV of FIG. 12, respectively.
Figure 14:
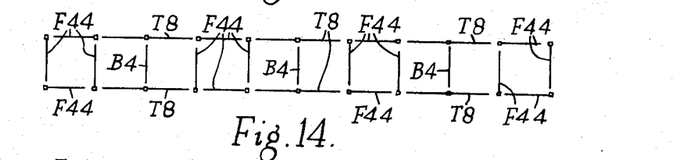
Figure 15:
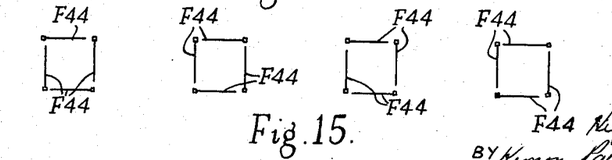

Each of the four towers is built of L-members (F44) 80 and rests on ground tie-members (T4) 81 and base plates (not shown). The upper connecting structure comprises ground tie-members (T8) 82, L-members F44, T-members T84 and straight braces B4, indicated in FIG. 14 by single lines, and which interconnect the two sides of the upper supporting structure.

FIG. 16 shows a supporting structure for a 12,800 gallon sectional water tank. The structure includes L- and T-members and rests on base plates (BP1) 85 and ground tie-members T4 and T8. Cap plates (CP1) 86 are located at the top of the structure to provide a supporting surface for the water tank 87. The channel members 22 provided on the cap plates are engaged by the upwardly projecting parts of the lugs 23 of the L- and T-members of the topmost lift and are thus firmly held in position.

Figure 17:
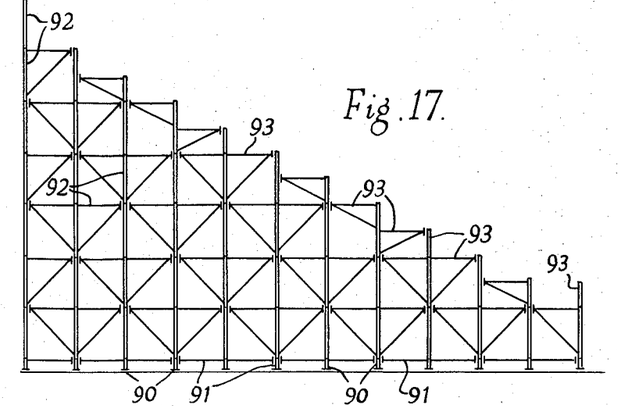
FIG. 17 is a diagrammatic elevation of one form of grandstand which may be constructed with the present members.

FIG. 17 shows one form of grandstand structure which may be built with the present members. The structure includes base plates (BP1) 90, ground tie-members (T4 and T8) 91, T- and L-members (F84 and F44) 92, L- and T-members (F42 and F82) 93.

Figure 18:
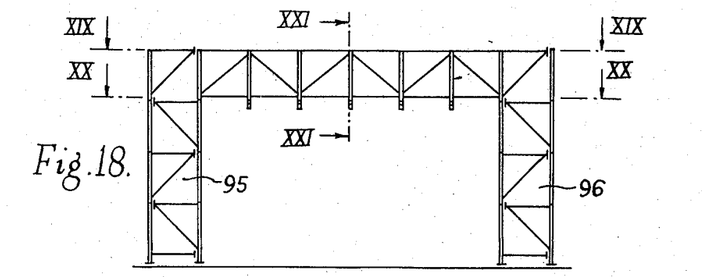
FIG. 18 is a diagrammatic elevation of a scaffold structure incorporating a beam of the same general kind as that shown in FIG. 9, and FIGS. 19, 20 and 21 are sections on the lines XIX—XIX, XX—XX, and XXI—XXI of FIG. 18, respectively
Figure 19:
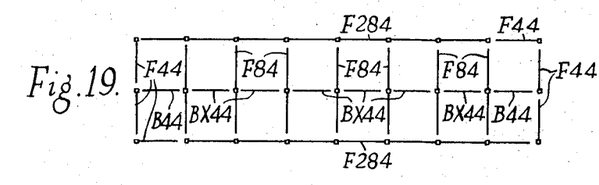
Figure 20:
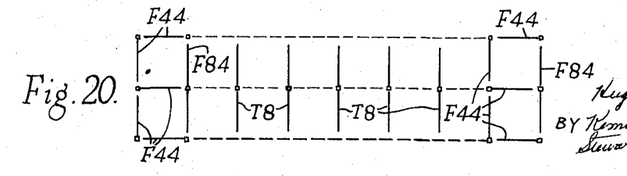
Figure 21:
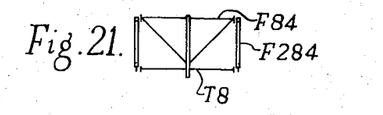

FIGS. 18, 19, 20 and 21 show a bridge construction using a made-up beam similar to that shown in FIG. 9. The beam shown is one 28 ft. long (F284), and it is supported on two towers 95 and 96 composed mainly of L-members (F44) and T-members (F84). Two beams F284 are used and their position is shown in FIG. 19. Ground tie-members T8 and T-members F84 are used to interconnect the beams as shown in FIGS. 18, 19 and 20 and the members T8 and F84 are interconnected by diagonal braces BX44 (see FIG. 7), as shown in FIG. 19. Two triangular braces B44 are used one at the top of each of the towers 95 and 96 (see FIG. 19).

The adjustable base plates (ABP1) may be used in place of the base plates BP1 in the structures just described if the structures are to be erected on uneven surfaces. As mentioned above, the adjustable posts may be included as a lift in a structure in order to enable the height of the upper part of the structure to be adjusted. Normally, the adjustable posts would be included as the uppermost lift of a structure and their top connecting members would be joined by ground tie-members T4 and T8.

Posts such as P4, P8 are intended to be used in special situations where there is no room for other frames.

Wooden working platforms may be secured on top of the scaffold structures, hand rails being provided by additional scaffold members where necessary.

The pins 34 may be used to secure the members together in permanent or semi-permanent structures and, as described with reference to FIG. 8, the pins 34 may themselves be secured in position by nails or split pins 37. Structures secured by the pins 34 will resist tensional forces and can be lifted and moved by a crane.

Figure 25:
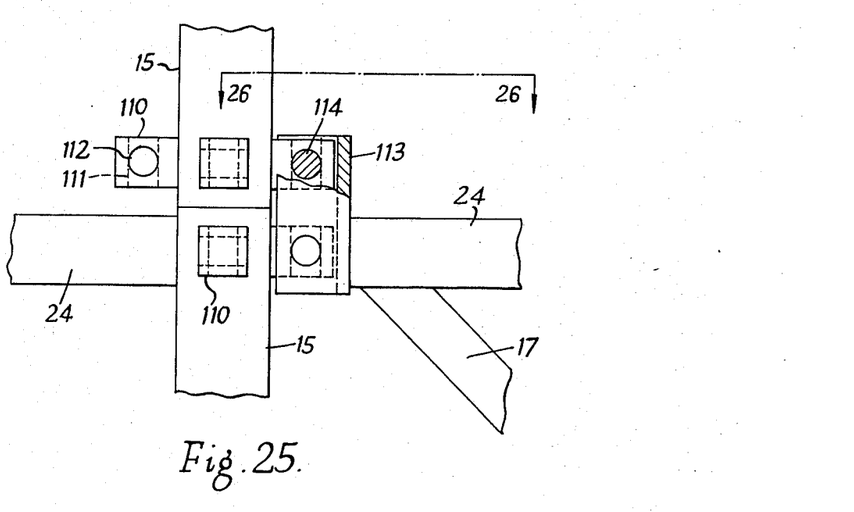
FIG. 25 is a side view of still another alternative means for engaging the L- and T-shaped members with one another, and showing a side view of a lug in position engaging the stems of two L- or T-shaped members.
Figure 26:
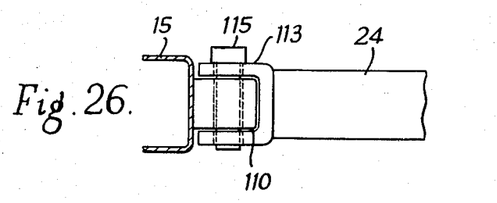
FIG. 26 is a sectional view, partly broken away, of the structure of FIG. 25 taken along the lines 26—26 thereof.

Coupling or engagement means other than the lugs 23 and channel members 19 and 22 may be used for engaging the scaffold members with one another. For example, pin joints as shown in FIGS. 25 and 26 may be employed. Such joints have some advantages but they must be pinned in every case whereas the joints described above (lugs 23 and channel members 19 and 22) need not always be pinned. The pin joints may comprise metal blocks 110 which project from the stems 15 of the members in the same positions as the channel members forming the sockets are located in the embodiment described above. Each block 110 has two holes drilled through it, a vertical hole 111 parallel to the stem, and a horizontal hole 112 at right-angles to the vertical hole and in a direction "across" the stem and not towards it. On the ends of each arm 24 of the members is secured a channel member 113 which is of such a size that the sides of the channel will engage over the sides of the metal blocks 110 projecting from the stems of the members. The channels are long enough to engage over the block at the bottom of one stem and the block at the top of another stem when the connecting member of the one (upper) stem is engaged in the socket at the top of the other (lower) stem. Holes 114 are formed in the sides of the channel members to allow pins 115 to be inserted through the channel members and through the blocks to secure the channel members to the blocks.

Normally the pins will extend through the horizontal holes in the blocks, but the provision of the vertical holes allows members to be secured together with their stems at right-angles to one another.

One advantage of this form of joint is that it enables lateral extensions to already built scaffold structures to be readily made, since the channel members will readily mate to the blocks projecting from the vertical stems of such structures.

Figure 22:
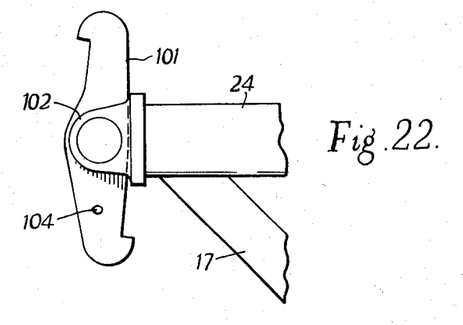
FIG. 22 is a side view of an alternative lug secured on the end of the arm of an L-shaped member.
Figure 23:
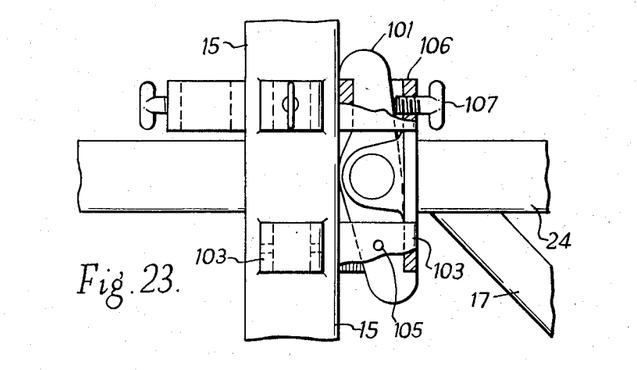
FIG. 23 is a side view of the lug of FIG. 22 in a position engaging the stems of two L- or T-shaped members.
Figure 24:
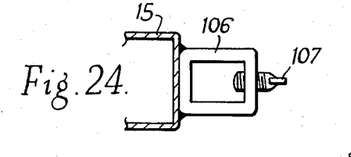
FIG. 24 is a sectional view through the stem of an L- or T-shaped member, partly broken away and showing the plan view of the member in FIG. 23 which co-operates with the lug of FIG. 22.

A further form of coupling means for coupling the members with one another is shown in FIGS. 22 and 23 and 24. A lug 101 is pivoted on a forging 102 welded to the end of an arm 24 of an L-member. (The same arrangement is, of course, also adapted for T-members.) The pivotal axis of the lug 101 is at right-angles to the arm 24 and is horizontal when the arm is horizontal.

Channel members 103 constituting coupling means are welded to the stem 15 of an L- or T-member and, in use, the lower part of the lug 101 is engaged in a channel member 103 as shown in FIG. 23. The lug 101 has a hook formation at each end and the periphery of the end of the hook is so shaped that when the lug is lowered into a channel member 103, the end of the lug engages the outer part of the channel member and the lug is rotated to the position shown in FIG. 22 thus enabling it to enter the channel member.

When the lug has been engaged in the channel member 103 and if no further members are to be added on top, the lug can be rotated to the position shown in FIG. 23 and secured by a pin inserted through the holes 104 and 105.

If an additional member is to be added on top, as it is lowered, the inner part of a member 106 of hollow rectangular section welded to the lower portion of the stem 15 of the additional member engages the inner rounded portion of the upper end of the lug 101 and moves it outward so that the lug occupies the position shown in FIG. 22 and can enter the socket in the member 106.

After the upper frame has been lowered into position, a thumbscrew 107, which is initially screwed out, is screwed in tight thus moving the lug 101 to the position shown in FIG. 23 and locking the members together.

In an alternative arrangement, the thumbscrews 107 and the rectangular hollow section members 106 are located on the lower frame and the channel members 103 are located on the upper frame, the pivoted lug 101 being turned upside down so that, when locked, it still engages over the outer lip of the channel member 103 and the inner lip of the rectangular hollow section member 106. In this case the brace is welded to the arm 24 at a position further to the right in the figures to allow room for the thumbscrew. Pins inserted in the holes 104 and 105 are then not required for locking the lugs 103 when an upper frame is not to be used since the thumbscrews are available to effect the locking.

In addition to scaffold members in the form of the L-shaped and T-shaped members described above, scaffold members with other shapes may be constructed.

One such member comprises a straight stem having a connecting member projecting axially from one end thereof and an axial socket formed in the other end thereof. An arm secured at an intermediate position along the stem extends at an acute angle from the stem, and the end of the arm being located between the two ends of the stem and carrying engagement means such as the lugs 23 described above. Corresponding engagement means such as the channel members 22 are provided at a position along the stem such that when two of the scaffold members are disposed adjacent one another with their ends in the same planes, the engagement means on the end of the arm of one member will engage with the corresponding engagement means on the stem of the other member, i.e. the corresponding engagement means are provided at a position along the stem opposite the end of the arm of the scaffold member.

The number of channel members provided at one position along the stem will be the same as in the case of the L- and T-members described above.

As an alternative to the above construction, two arms may extend from the stem of the scaffold member and be joined near their outer ends then forming a triangle-shaped member with the stem. A lug 23 is secured to the arms near where they join.

Other scaffold members which may be used in accordance with the invention comprise L- and T-members having extended stems. Thus, the arm or cross-member of the scaffold member extends at right-angles from an intermediate position, e.g. half-way, along the total length of the stem. In this case, corresponding engagement means are provided on the stem only near the position at which the arm or cross-member is secured to the stem and not near the connecting member as well. Scaffold members of this kind are connected together in a similar manner to the normal L- and T-members described above except that they will not be engaged with one another near their connecting members.

Further scaffold members have two arms extending from one side of the stem, e.g. two parallel arms extending at right-angles from the stem at spaced intermediate positions therealong. Other members for use with these scaffold members have a pair of arms extending from each of two opposite sides of the stem. The arms carry engagement means at their free ends and may be interconnected by braces. Two sets of corresponding engagement means are provided on the stems of these scaffold members for engagement with the engagement means on the two arms of like or similar members.

I claim:

1. A scaffold member for the construction of scaffolding, said member comprising,
   a single upright,
   a connecting pin projecting axially from one end of the upright,
   an axially disposed socket structure at the end of the upright remote from said connecting pin, said structure being adapted to receive the connecting pin of a like scaffold member the upright of which is placed end to end with the upright of the first-mentioned member,
   an arm extending laterally from the upright, at least the free end of said arm being substantially level with a first end of said upright,
   a coupling member on the free end of the arm, said coupling member being constituted by a first and second portion projecting to opposite sides of said arm,
   coupling means located on the upright at said first end thereof,
   further coupling means located on the upright at a second end thereof,
   each of said coupling means at said first end of the upright being adapted to couple with a part of a coupling member at the free end of the arm of a like scaffold member and each of the coupling means at said second end of the upright being adapted to couple with another part of a coupling member at the free end of the arm of a like scaffold member, whereby like scaffold members as defined above may be erected to form a scaffold with their uprights vertically above one another, and connected by said pins and sockets and coupled by said coupling members each of which couples with coupling means at a first end of one upright and at a second end of a vertically adjacent upright.

2. A scaffold member for the construction of scaffolding said member comprising
   a single upright,
   a connecting pin projecting axially from one end of the upright,
   an axially disposed socket structure at the end of the upright remote from said connecting pin, said structure being adapted to receive the connecting pin of a like scaffold member placed end to end with the first-mentioned member,
   an arm extending laterally from the upright on one side thereof and
   a second arm extending laterally from the upright on the opposite side thereof, said arms having free ends on a level with a first end of said upright,
   identical coupling members at the free end of each of said arms,
   coupling means located on the upright at said first end thereof,
   further coupling means located on the upright at a second end thereof,
   each of said coupling means at said first end of the upright being adapted to couple with a part of a coupling member at the free end of an arm of a like scaffold member and each of said coupling means at a second end of the upright being adapted to couple with another part of a coupling member at the free end of an arm of a like scaffold member, whereby like scaffold members as defined above may be erected to form a scaffold with their uprights vertically above one another and connected by said pins and sockets and coupled by said coupling members each of which couples with coupling means at a first end of one upright and at a second end of a vertically-adjacent upright.

3. A scaffold structure comprising in combination L-shaped scaffold members and T-shaped scaffold members,
   each T-shaped member comprising
      a single upright and a horizontal arm extending out from a first end of the upright, and
   each T-shaped member comprising
      a single upright and a horizontal-extending cross-piece at a first end of said upright,
   each L-shaped member and each T-shaped member having a connecting pin projecting axially from one end of the upright and an axially disposed socket structure at the end of the upright remote from the connecting pin and receiving the connecting pin of another of the scaffold members placed with its upright end to end with the first-mentioned members, a coupling member disposed on the free end of the arm of each L-shaped member and each of the two free ends of the arms of the cross-piece of each T-shaped member, each L-shaped member and each T-shaped member having coupling means at said first end of its upright, said coupling means each being coupled with a part of each coupling member of the other scaffold members of the structure, each L-shaped member and each T-shaped member having further coupling means at a second end of the upright, said coupling means each being coupled with another part of each coupling member of the other scaffold members of the structure, wherein said L-shaped and T-shaped members of said scaffold structure are combined together in a series of successively higher stories, the uprights of scaffold members in the higher stories of the structure being located vertically above uprights of scaffold members in the stories below, and the uprights being connected together by said connecting pins and sockets, and wherein each pair of vertically-adjacent scaffold members are coupled together by coupling members of scaffold members in the same story as one of the members of said pair, said coupling members coupling with coupling means at the first end of one of said scaffold members of said pair and with coupling means at the second end of said other scaffold member of said pair.

4. A scaffold member for the construction of scaffolding said member comprising
  a single upright,
  a connecting pin projecting axially from one end of the upright,
  an axially disposed socket structure at the other end of the upright remote from said connecting pin, said structure being adapted to receive the connecting pin of a like scaffold member the upright of which is placed end to end with the upright of the first-mentioned member,
  an arm extending laterally from the upright, at least the free end of said arm being substantially level with a first end of said upright,
  a coupling member on the free end of the arm,
  three coupling means located on the upright at said first end thereof said three coupling means and said arm being spaced equidistantly around said upright,
  four coupling means located on the upright at a second end thereof, one in line with each of said first-mentioned three coupling means and one in line with said arm, each of said coupling means at said first end of the upright being adapted to couple with a part of a coupling member at the free end of the arm of a like scaffold member and each of said coupling means at said second end of the upright being adapted to couple with another part of a coupling member at the free end of the arm of a like scaffold member,
whereby like scaffold members as defined above may be erected to form a scaffold with their uprights vertically above one another, and connected by said pins and sockets and coupled by said coupling members each of which couples with coupling means at a first end of one upright and at a second end of a vertically-adjacent upright.

5. A scaffold member according to claim 4, wherein each coupling means at said first and second ends of the upright is constituted by a U-shaped member secured to the upright with its open end adjacent the upright so as to form therewith a socket for the reception of the corresponding part of a coupling member of a like scaffold member, and wherein the first-mentioned coupling member is constituted by a lug secured on the end of the arm of the scaffold member, the coupling member being constituted by first and second parts of said lug projecting to opposite sides of said arm, the said first and second projecting parts of the lug being adapted to engage in the corresponding coupling sockets of a like scaffold member.

6. A scaffold member according to claim 5, wherein the U-shaped members and the lug constituting the first-mentioned coupling member are formed with holes therein, and wherein coupling pins are provided for insertion in said holes, whereby the first-mentioned coupling member can be secured in the coupling sockets of like scaffold members by insertion of said coupling pins through the corresponding holes in a U-shaped member and the lug engaged within it.

7. A scaffold member according to claim 4, wherein each coupling means at said first and second ends of the upright is constituted by a rectangular-section tube member, one side of the tube being secured to the upright and the axis of the tube being parallel to the axis of the upright, whereby the tube member provides a socket for the reception of the corresponding part of the coupling member of a like scaffold member, and wherein the first-mentioned coupling member is constituted by a lug mounted for rocking movement about a horizontal axis extending transversely of the arm, the first-mentioned coupling member being constituted by first and second parts of said lug projecting to opposite sides of said arm, the lug having hook members on its first and second projecting parts directed in opposite directions with respect to one another, whereby when the first and second projecting parts of the lug are located in the rectangular-section sockets at the second and first ends respectively of uprights of similar superimposed scaffold members the lug can be rocked so as to engage the hook members over the edges of opposite sides of the rectangular-section tube, and means for locking the lug in the engaged position.

8. A scaffold member for the construction of scaffolding said member comprising,
  a single upright,
  a connecting pin projecting axially from one end of the upright,
  an axially disposed socket structure at the end of the upright remote from said connecting pin, said structure being adapted to receive the connecting pin of a like scaffold member placed end to end with the first-mentioned member,
  an arm extending laterally from the upright on one side thereof and
  a second arm extending laterally from the upright on the opposite side thereof, said arms having free ends on a level with a first end of said upright,
  identical coupling members at the free end of each of said arms,
  two coupling means located on the upright at said first end thereof, said two coupling means and said arms being spaced equidistantly around said upright,
  four coupling means located on the upright at a second end thereof one in line with each of said first-mentioned coupling means and one in line with each of said arms, each of said coupling means at said first end of the upright being adapted to couple with a part of a coupling member at the free end of an arm of a like scaffold member and each of said coupling means at said second end of the upright being adapted to couple with another part of a coupling member at the free end of an arm of a like scaffold member, whereby like scaffold members may be erected to form a scaffold with their uprights vertically above one another and connected by said pins and sockets and coupled by said coupling members each of which couples with coupling means at a first end of one upright and at a second end of a vertically-adjacent upright.

9. A scaffold member according to claim 8, wherein each coupling means at said first and second ends of the upright is constituted by a U-shaped member secured to the upright with its open end adjacent the upright so as to form therewith a socket for the reception of the corresponding part of a coupling member of a like scaffold member, and wherein each of the first-mentioned coupling members is constituted by a lug secured on the end of the corresponding arm of the scaffold member, the coupling member being constituted by first and second parts of said lug projecting to opposite sides of said arm, the first and second projecting parts of the lug being adapted to engage in the corresponding coupling sockets of a like scaffold member.

10. A scaffold member according to claim 9, wherein the U-shaped members and the lugs constituting the coupling members are formed with holes therein, and wherein coupling pins are provided for insertion in said holes whereby the coupling members can be secured in the coupling sockets of like scaffold members by insertion of said coupling pins through corresponding holes in the U-shaped members and the lugs engaged within them.

11. A scaffold member according to claim 8, wherein each coupling means at said first and second ends of the upright is constituted by a rectangular-section tube member one side of the tube being secured to the upright and the axis of the tube being parallel to the axis of the upright, whereby the tube member provides a socket for the reception of the corresponding part of the coupling member of a like scaffold member and wherein each coupling member is constituted by a lug mounted for rocking movement about a horizontal axis extending transversely of the arm, said coupling member being constituted by first and second parts of said lug projecting to opposite sides of said arm, the lug having hook members at its upper and lower ends directed in opposite directions with respect to one another, whereby when the first and second projecting parts of the lug are located in the rectangular-section sockets at the second and first ends respectively of the uprights of similar superimposed scaffold members, the lug can be rocked so as to engage the hook member over the edges of opposite sides of the rectangular-section tube, and means being provided for locking the lug in the engaged position.

12. A scaffold structure comprising in combination L-shaped scaffold members and T-shaped scaffold members, each L-shaped member comprising
    a single upright and a horizontal arm extending out from a first end of the upright, and each T-shaped member comprising
    a single upright and a horizontally-extending cross-piece at a first end of said upright,
each L-shaped member and each T-shaped member having a connecting pin projecting axially from one end of the upright and an axially disposed socket structure at the end of the upright remote from the connecting pin and receiving the connecting pin of another of the scaffold members placed with its upright end to end with the first-mentioned members, a coupling member disposed on the free end of the arm of each L-shaped member and each of the two free ends of the arms of the cross-piece of each T-shaped member, each L-shaped member having three coupling means at said first end of its upright, said coupling means and said arm being spaced equidistantly around the upright, each T-shaped member having two coupling means at said first end of its upright, said coupling means and the two parts of said cross-piece being spaced equidistantly around the upright, said coupling means at the first ends of the uprights of the L-shaped and T-shaped members each being coupled with a part of each coupling member of the other scaffold members of the structure, each L-shaped and T-shaped member having at the second end of its upright four coupling means spaced equidistantly around the upright, one of which on the L-shaped member is located in line with the arm and two of which on the T-shaped member are located one in line with each of the two arms of the cross-piece, respectively, said coupling means at the second ends of the uprights each being coupled with another part of each coupling member of the other scaffold members of the structure, wherein said L-shaped and T-shaped members of said scaffold structure are combined together in a series of successively higher stories, the uprights of scaffold members in the higher stories of the structure being located vertically above uprights of scaffold members in the stories below, and the uprights being connected together by said connecting pins and sockets, and wherein each pair of vertically-adjacent scaffold members are coupled together by coupling members of scaffold members in the same story as one of the members of said pair, said coupling members coupling with coupling means at the first end of one of said scaffold members of said pair and with coupling means at the second end of said other scaffold member of said pair.

13. A scaffold structure according to claim 12, wherein each of said coupling means on the L-shaped and T-shaped scaffold members is constituted by a U-shaped member secured to the upright of the scaffold member with its open end adjacent the upright so as to form therewith a socket which receives the corresponding part of a coupling member of another of the scaffold members and wherein each of said coupling members is constituted by a lug secured on the end of the corresponding arm of the scaffold member, the coupling member being constituted by first and second parts of said lug projecting to opposite sides of said arm, the first and second projecting parts of the lug engaged in the corresponding coupling sockets of a like scaffold member.

14. A scaffold structure according to claim 13, wherein the U-shaped members and the lugs constituting the coupling members are formed with holes therein and wherein coupling pins are inserted in said holes whereby the coupling members are secured in the coupling sockets of other scaffold members by insertion of said coupling pins through corresponding holes in the U-shaped members and the lugs engaged within them.

15. A scaffold structure according to claim 12, wherein each of said coupling means on the L-shaped and T-shaped scaffold members is constituted by a square-section tube member one side of the tube being secured to the upright of the scaffold member and the axis of the tube being parallel to the axis of the upright, whereby the tube member provides a socket for the reception of the corresponding part of the coupling member of another scaffold member and wherein each coupling member is constituted by a lug mounted for rocking movement about a horizontal axis extending transversely of the arm, the coupling member being constituted by first and second parts of said lug projecting to opposite sides of said arm, the lug having hook members on its first and second projecting parts directed in opposite directions, whereby the first and second projecting parts of the lug are located in the rectangular-section sockets at the second and first ends respectively of the uprights of superimposed scaffold members and the lug is then rocked so as to engage the hook members over the edges of opposite sides of the rectangular-section tube, locking members being provided for locking the lug in the engaged position.

16. A scaffold structure according to claim 12, wherein each of said coupling means on the L-shaped and T-shaped scaffold members is constituted by a lug formed with an aperture therein and wherein each of said coupling members is constituted by an apertured channel section member having the open side of the channel extending outwardly of the arm to which said channel member is secured, each of said channel members being engaged in said scaffold structure over two lugs on each of the adjacent ends of the uprights of two vertically adjacent scaffold members and being coupled with said lugs by pins inserted through corresponding apertures in said lugs and said channel member.

17. A scaffolded structure comprising in combination L-shaped scaffold members and T-shaped scaffold members, each L-shaped member comprising
    a single upright and a horizontal arm extending laterally from one end of the upright, and each T-shaped member comprising
    a single upright and a horizontally-extending cross-piece, each L-shaped member and each T-shaped member having a connecting pin projecting axially from the lower end of the upright and an axially disposed socket structure at the upper end of the upright receiving the connecting pin of another of the scaffold members placed on top of the first-mentioned members, each L-shaped member having on the free end of its arm and each T-shaped member having on each of the two free ends of its cross-piece a coupling member projecting upwardly and downwardly thereof, each L-shaped and T-shaped member having at the lower end of its upright four coupling means spaced equidistantly around the upright and one of which on the L-shaped member is located beneath the arm and two of which on the T-shaped member are located one beneath each of the two arms of the cross-piece, respectively, said coupling means being coupled with the upwardly-projecting parts of the coupling members of the other members of the scaffold structure, each L-shaped member having three coupling means at the upper end of its upright, said coupling means and said arm being spaced equidistantly around the upright, each T-shaped member having two coupling means at the upper end of its upright, said coupling means and the two arms of said cross-piece being spaced equidistantly around the upright, said coupling means at the upper ends of the upright of the L-shaped and T-shaped members each being coupled with the downwardly projecting parts of the coupling members of other scaffold members of the structure, wherein said L-shaped and T-shaped members of said scaffold structure are combined together in a series of successively higher stories, the uprights of scaffold members in the higher stories of the structure being located vertically above the uprights of scaffold members in the story below, and the connecting pins of said scaffold members in the higher stories engaging in the socket structures of the scaffold members in the story below, and each coupling member of each scaffold member in a lower story is coupled with a coupling means at the top of the upright of one adjacent scaffold member in the same story and with a coupling means at the lower end of the upright of the scaffold member immediately above the said one scaffold member, thereby providing a coupling between said scaffold members.

18. A scaffold structure according to claim 17, including L-shaped tie-members and T-shaped tie-members, each L-shaped tie-member comprising a single upright which is short in comparison to the uprights of the L-shaped and T-shaped scaffold members and a horizontal arm extending laterally from the upper end of the upright, each T-shaped tie-member comprising an upright and a horizontal cross-piece at the upper end of the upright, each L-shaped and T-shaped tie-member having an axially disposed socket structure at the upper end of the upright receiving the connecting pins of said L-shaped and T-shaped scaffold members of the scaffold structure, each L-shaped tie-member having on the free end of its arm and each T-shaped tie-member having on the free ends of its cross-piece a coupling member projecting upwardly and downwardly thereof, the upwardly projecting part of the said coupling member being coupled with the coupling means at the lower ends of uprights of the L-shaped and T-shaped scaffold members, each L-shaped tie-member having at the upper end of its upright three coupling means, said coupling means and said arm being spaced equidistantly around the upright, each T-shaped tie-member having at the upper end of its upright two coupling means, said coupling means and the two parts of said cross-piece being spaced equidistantly around said upright, each of said coupling means on said L-shaped and T-shaped tie-members being coupled with the downwardly projecting part of a coupling member on the free end of the arm of another of the tie members, said tie-members being incorporated in said scaffold structure below the lowest story composed of L-shaped and T-shaped members, the connecting pins of said L-shaped and T-shaped members being engaged in the socket structures of respective tie-members and the coupling members on the ends of the arms of respective tie-members being coupled with the coupling means at the lower ends of the uprights of L-shaped and T-shaped members in the lowest story and with the coupling means on the uprights of the tie-members below said L-shaped and T-shaped members.

19. A scaffold structure according to claim 17, including a straight beam comprising a series of parallel uprights, a series of parallel connecting arms rigidly connecting said uprights at the top and bottom, connecting pins, one projecting axially from the lower end of each of said uprights, an axially disposed socket structure at the upper end of each of said uprights, a horizontal arm projecting out from an end one of said uprights in line with said connecting arms, a coupling member on the free end of said horizontal arm and projecting upwardly and downwardly thereof, and coupling means at the upper and lower ends of said uprights, said beam being incorporated in said scaffold structure with at least one of its connecting pins engaged in the socket structure of another scaffold member and at least one connecting pin of another scaffold member engaged in the socket structure of one of the uprights of the beam, and at least one of said coupling means of said beam being coupled with a coupling member of another scaffold member.

References Cited by the Examiner
UNITED STATES PATENTS

| | | | |
|---|---|---|---|
| 2,185,948 | 1/1940 | Pimm | 182—178 |
| 2,303,428 | 12/1942 | Black | 52—645 |
| 2,311,988 | 2/1943 | Lavin | 52—637 |
| 2,452,487 | 10/1948 | O'Sullivan | 52—637 |
| 2,765,200 | 10/1956 | Moyer | 52—637 |
| 2,833,421 | 5/1958 | Skubic | 182—178 |
| 2,988,180 | 6/1961 | Campbell | 52—637 |

FOREIGN PATENTS 1,188,571    1959    France.

FRANK L. ABBOTT, Primary Examiner.

JACOB L. NACKENOFF, RICHARD W. COOKE, JR.,
Examiners.